United States Patent [19]

Driscoll

[11] 4,383,012
[45] May 10, 1983

[54] LIQUID CATHODE ELECTROCHEMICAL CELL WITH IMPROVED GEOMETRY AND CONTAINING A HIGH EFFICIENCY CATHODE CURRENT COLLECTOR

[75] Inventor: Joseph R. Driscoll, Sunnyvale, Calif.
[73] Assignee: Altus Corporation, San Jose, Calif.
[21] Appl. No.: 290,607
[22] Filed: Aug. 6, 1981
[51] Int. Cl.³ .............................................. H01M 4/36
[52] U.S. Cl. .................................... 429/101; 429/196
[58] Field of Search ....................... 429/101, 194, 196

[56] References Cited

U.S. PATENT DOCUMENTS

| | | | |
|---|---|---|---|
| 4,032,696 | 6/1977 | Yary | 429/101 |
| 4,159,367 | 6/1979 | Berchielli et al. | 429/101 X |
| 4,296,187 | 10/1981 | Baines et al. | 429/194 X |

Primary Examiner—Charles F. LeFevour
Attorney, Agent, or Firm—Flehr, Hohbach, Test, Albritton & Herbert

[57] ABSTRACT

An electrochemical cell having improved efficiency and life is provided wherein substantially the total volume of the liquid cathode is contained within the pores of a solid, porous, nonconsummable current collector and separator, said current collector having a first constituent consisting of an electrically conducting material which is less electropositive than the anode, and a second constituent consisting of an electrically nonconductive material, said first and second constituents being combined such that the resistivity of said current collector varies inversely with the distance from said anode.

12 Claims, 7 Drawing Figures

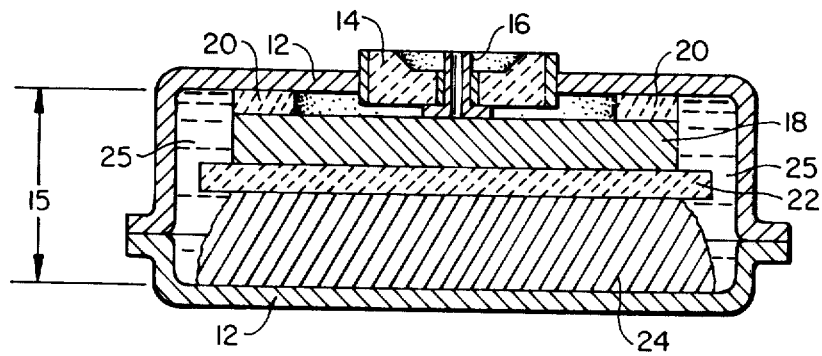
FIG.__1.
FIG.__2.
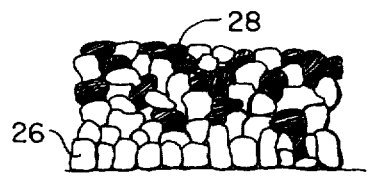
FIG.__3.

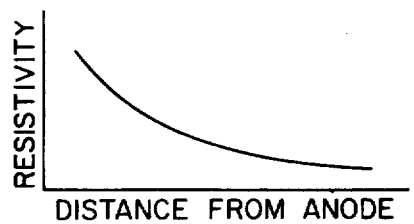
FIG._4.
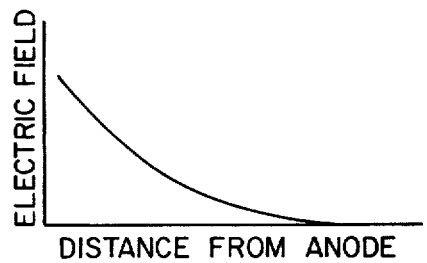
FIG._5.
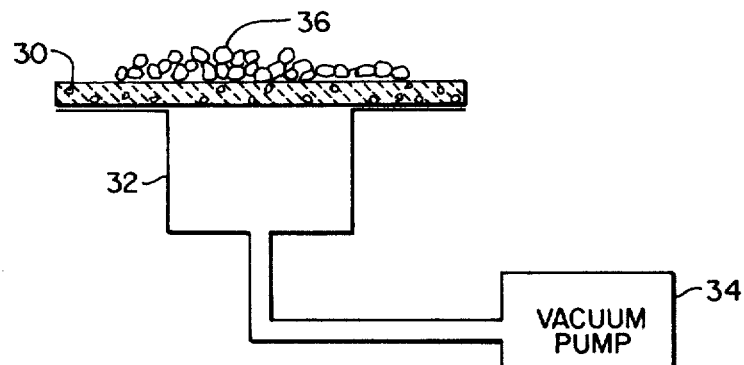
FIG._6.
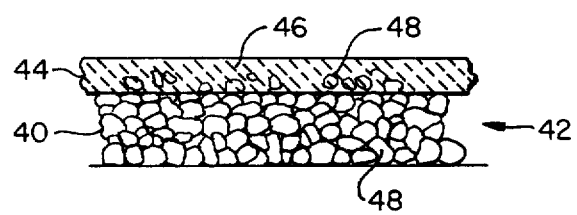
FIG._7.

LIQUID CATHODE ELECTROCHEMICAL CELL WITH IMPROVED GEOMETRY AND CONTAINING A HIGH EFFICIENCY CATHODE CURRENT COLLECTOR

This invention relates to electrochemical cells and batteries. More particularly, it relates to improved cell geometry and to a structure causing improved efficiency in the cathode current collector of liquid cathode cells.

Over the past several years, a class of cells commonly known as a liquid cathode cell has emerged as the best candidate to provide substantially increased performance over the age-old zinc-carbon, alkaline, and silver oxide cells.

The liquid cathode cells are distinguished from the more conventional cells in that the active cathode depolarizer is a liquid. The basic elements of the cell are an anode, typically consisting of an alkali or alkaline earth metal; a current collector spaced from the anode so that shorting will not occur and consisting of a high surface area material that is catalytically active in the reduction of the liquid cathode; a suitable separator located between the current collector and the anode and mechanically separating the two; and the electrolyte which includes the liquid cathode as well as an ionically conductive solute dissolved in a liquid solvent. In certain type cells the solvent performs the additional function of active cathode depolarizer.

The liquid cathode cells that are most commonly discussed in the literature as having the best performance characteristics are those using lithium metal anodes and active cathode depolarizers that are either oxyhalides, such as thionyl chloride, or sulfur dioxide. A detailed description of the construction and operation of sulfur dioxide cells may be found in U.S. Pat. No. 3,567,515 issued to Maricle on Mar. 2, 1971. Likewise, a detailed description of the construction and operation of oxyhalide cells may be found in British Pat. No. 1,409,307 issued to Blomgren et al. on Oct. 8, 1975, and U.S. Pat. No. 3,926,669 issued to Auborn on Dec. 16, 1975. To date, the current collectors found to provide the best performance consist of a mixture of a particulate copper and carbon, see, for example, U.S. Pat. No. 4,167,608 to Giattino.

In lithium thionyl chloride cells, the electrolyte solvent, thionyl chloride, is the active cathode depolarizer and is utilized in the electrochemical reaction. As a result, the amount of liquid solvent in the cell is continually reduced as the cell is discharged. The molarity of the electrolyte is continually increased, and the liquid phase of the electrolyte gradually disappears. As this occurs, the dissociated solute ions, which are the electrical charge carriers, recombine and are unavailable to conduct between the anode and current collector. As this process progresses, the internal resistance of the cell increases, which reduces the current delivery capability of the cell. This process was corrected in prior art cells by the inclusion of an electrolyte solvent reservoir.

We have found, however, that the elimination of an electrolyte solvent reservoir can increase the life of the cell by up to about 25%. Tests have shown that if the electrolyte solvent reservoir is eliminated by being filled with a non-reactive material, in contrast to additional active materials, an improvement in cell life of up to about 25% is achieved.

Additionally while the use of a copper and carbon current collector is known to enhance the performance of oxyhalide batteries, we have further found that the performance of liquid cathode cells may be substantially enhanced by construction of a current collector in accordance with the present invention.

It is an object of the invention to improve the performance of liquid cathode electrochemical cells.

Another object of the invention is to provide a superior current collector structure for liquid cathode cells.

Yet another object of the invention is to provide a current collector structure for lithium anode, thionyl chloride electrochemical cells that substantially increases cell life.

These and other objects of the invention are achieved in a primary electrochemical cell having an oxidizable anode, a liquid cathode, and a solid current collector by constructing the current collector such that it is the combination of a first constituent consisting of an electrically conducting material less electropositive than the anode and a second constituent consisting of a nonconductive material. The first and second constituents of the current collector are combined such that the resistivity of the current collector varies inversely with the distance from the anode.

It is also an object of this invention to improve the efficiency of the lithium anode, thionyl chloride active cathode electrochemical cell by utilizing a cell geometry that incorporates substantially all of the electrolyte solvent within the pores of the solid current collector and separator to the exclusion of reservoirs within the cell for the electrolyte solvent.

FIG. 1 is a cross-section of a conventional liquid cathode electrochemical cell.

FIG. 2 is a cross-section of the current collector of an electrochemical cell made in accordance with the prior art.

FIG. 3 is a cross-section of a current collector made in accordance with the present invention.

FIG. 4 is a graph showing the resistivity of the current collector of FIG. 3 as a function of the distance from the anode.

FIG. 5 is a graph showing the electric field within the current collector of FIG. 3 as a function of the distance from the anode.

FIG. 6 is a cross-sectional view of an apparatus useful for manufacturing current collectors in accordance with the present invention.

FIG. 7 is a cross-sectional view of an embodiment made with the apparatus of FIG. 6.

The basic operation of liquid cathode type electrochemical cells is well understood. When the external circuit is closed, an oxidation reaction occurs at the anode surface which releases an electron into the external circuit and a positively charged metal ion into the electrolyte. Because of the electric field between the current collector and the anode, the metal ion moves through the electrolyte towards the current collector. For example, with a lithium anode, the reaction is:

$$Li \rightarrow Li^+ + e^-$$

At approximately the same time, a reduction reaction occurs on the current collector surface. It is now generally believed that the current collector, while not participating in the electrochemical reaction, does offer an active catalytic surface upon which the liquid cathode is reduced.

In this case, the positive lithium ion migrates through the electrolyte toward the current collector under the influence of the electrical field between the anode and the current collector. When the lithium ion reaches the current collector, it, in combination with the catalytic surface of the current collector, acts to reduce the liquid cathode. In the case of the oxyhalide, thionyl chloride, for example, the reduction reaction is as follows:

$$4e^- + 2SOCl_2 \rightarrow SO_2 + S + 4Cl^-$$

In the case of a lithium anode, thionyl chloride liquid cathode, the most commonly accepted complete reaction is:

$$4Li + 2SOCl_2 \rightarrow 4LiCl + SO_2 + S$$

The lithium chloride salt is insoluble in thionyl chloride and deposits out on the cathode current collector surface. At the point where deposition takes place, the catalytic activity of the current collector is eliminated. Thus, as the lithium chloride builds up, it reduces the ability of the current collector to perform its catalytic function and reduces the capability of the cell to deliver electrons to an external circuit. This is commonly called polarization.

Since the current collector is a good conductor, and the field within a conductor is well known to be zero, there is no electrical force to cause the lithium ion to go beyond the surface of the current collector closest to the anode. As a result, most of the catalysis sites are on or near the surface of the current collector closest to the anode and the remainder of the catalysis sites are never used.

The present invention solves this problem by selectively varying the resistivity of the current collector in such a way that a substantially larger percentage of catalysis sites is used for reduction of the liquid cathode.

We have further found that the elimination of an electrolyte solvent reservoir can increase the life of the cell up to about 25%. Tests have shown that if the electrolyte solvent reservoir is eliminated and filled with a nonreactive material, in contrast to additional active materials, an improvement in cell life of up to about 25% is achieved. While not limiting the invention to any particular theory of operation, it is believed that this results may be due to the lack of a liquid reservoir to dissolve the reaction byproducts such as sulfur dioxide. And, the undissolved byproducts may in some way catalyze the primary electrochemical reaction of the cell or possibly enter into a secondary electrochemical reaction.

The operation of the invention may beter be understood from the following detailed description taken in connection with the drawings.

FIG. 1 represents a cross-sectional view of a typical liquid cathode cell. Referring to FIG. 1, there is shown a casing 12 which is at cathode potential and isolated by a nonconductive, hermetic seal 14 from a pin 16 at anode potential. Pin 16 is connected to anode 18 which may be any alkali or alkaline earth metal, preferably lithium. A separator material 20 isolates anode 18 from the casing surface 12. A second separator 22 separates the anode from current collector 24. The cell, to be operable, is filled with an appropriate electrolyte consisting of a liquid cathode and an electronically conductive solute dissolved in a solvent.

The volume which is occupied by the electrolyte solution in this typical cell comprises the annular void space 25, and the pores within separator 22 and current collector 24. The electronically conductive solute may be a simple or double salt which will produce an ionically conductive solution when dissolved in thionyl chloride. Preferred solutes are complexes of inorganic or organic Lewis acids and inorganic, ionizable salts. In particular, the double salt that is formed by the combination of aluminum chloride and lithium chloride to yield lithium aluminum tetrachloride is preferred. The solvent, in addition to acting as the carrier for the solute may also be the active cathode depolarizer. Alteratively, an entirely separate active cathode depolarizer such as $SO_2$ may be dissolved in the solvent material. In any event, the active cathode depolarizer is a liquid at normal operating temperatures.

In accordance with the instant invention, the void volume 25 which is a reservoir for electrolyte solution is substantially eliminated by anyone or any combination of the following: variation of the height 15 of the cell, variation of the size, density and composition of the separator 22 and collector 24; or incorporation of solid inert spacers to fill void volume 25. FIG. 2 is an enlarged cross-sectional view of current collector 24. It consists of a high surface area conductive material that is less electropositive than the anode and that is catalytically active. It has generally been found that substantially carbonaceous current collectors are preferred. A preferred embodiment for a lithium anode thionyl chloride liquid cathode cell includes a mixture of finely divided copper and carbon. In FIG. 2, the particles that are illustrated are those that make up the typical current collectors and may be carbon or a combination of carbon and other materials such as copper.

As can be seen from FIG. 2, the current collector is substantially homogeneous from top to bottom and consists of a large number of conductive particles in contact with each other.

In addition to having a large surface area, the current collector also is substantially porous. This allows for the penetration of the electrolyte solution which in turn makes possible effective operation of the cell.

FIG. 3 illustrates a current collector made in accordance with the present invention wherein there is a conductive constituent and a nonconductive constituent. Referring to FIG. 3, the conductive constituent consists of particles 26 and are illustrated as light and the non-conductive constituent consists of particles 28 that are illustrated as dark. The relative percentage of conductive particles 26 to nonconductive particles 28 increases as the distance from the anode increases. As a result, the resistivity, which is measured in ohms per unit volume of current collector, decreases as the distance from the anode increases.

FIG. 4 generally illustrates the relationship between the resistivity in the current collector made in accordance with the present invention and the distance from the anode.

FIG. 5 generally illustrates the relationship between the electric field within the current collector and the distance from the anode. Thus, the electrical field within the current collector of FIG. 3 is greatest at the surface nearest the anode and decreases to near zero as the distance from the anode increases.

As a result of the structuring of the electric field in the current collector, anode ions have a probability of reaching further into the current collector to find a catalysis site for the reduction of the liquid cathode.

This results in a substantial increase in the capacity of electrochemical cell made in accordance with the present invention.

The current collector structure of the present invention may be made by any suitable procedure. A preferred procedure calls for drawing a fine mixture of the conductive current collector material into a fibrous mat of highly dielectric material. The dielectric material may be, for example, any of a number of ceramic or glass papers. The preferred material comprises substantially alumina. The conductive current collector material may be carbon or a combination of carbon and copper in the case of lithium thionyl chloride cells. The conductive current collector material is drawn into the fibrous non-conductive mat by vacuum. This procedure is illustrated generally by FIG. 6.

Referring to FIG. 6, a piece of non-conductive ceramic mat 30 is placed across a vessel 32 upon which a vacuum may be drawn by vacuum pump 34. Finely divided particles of conductive current collector 36 are then sprinkled onto sheet 30 and pulled into the interstices among the fibers of mat 30 by the vacuum in chamber 32.

We have found that with this process, the conductive particles 36 are not pulled completely through mat 30. Thus, the bottom layer of mat 30 is still made completely of insulating particles. Accordingly, in a proper embodiment 30 may be used both as a current collector and a separator 22.

FIG. 7 illustrates the embodiment made with the apparatus of FIG. 6. Referring now to FIG. 7, portion 40 of current collector and separator combination 42 consists entirely of conductive particles. Portion 44 consists of a ceramic mat 46 into which a quantity of conductive particles 48 have been drawn part way. As a result, portion 44 is made up of a nonconductive constituent—the ceramic mat 46—and a conductive constituent—particles 48. The quantity of conductive particles per unit area increases from substantially zero at the surface facing the anode to a quantity sufficient to substantially increase the conductivity of portion 44 at the surface where portion 44 and portion 40 come together.

An alternative method of manufacturing the current collector made in accordance with the present invention calls for the manufacture of several layers of current collector material, for example, four. The first layer is made of 25% nonconductive particles and 75% conductive particles. The second layer is made of 50% conductive particles and 50% nonconductive particles. The third layer is made of 75% conductive particles and 25% nonconductive particles, and the fourth layer is made of 100% conductive particles. In a typical cell, each layer may be anywhere from one to 20 mils in thickness. Each of the layers is then stacked, one on top of the other, and assembled into the cell such that layer one is closest to the anode and layers two, three and four are successively further from the anode. With this approach, a conventional separator material as described in the above-mentioned Blomgren or Auborn patents is also required.

EXAMPLE 1

Sample cells were made in a demountable hermetic cell casing of 2.5 inch diameter similar to that shown in FIG. 1. In each instance the anode was a sheet of lithium metal. The separator 22 (FIG. 1) was a ceramic paper allowing free flow of liquids but mechanically separating the anode from the current collector. The electrolyte solution was a 2.3 molar solution of aluminum trichloride in thionyl chloride. The current collector had a base portion weighing 260 mg. made exclusively of the conductive mixture of carbon and copper made in accordance with U.S. Pat. No. 4,167,608.

In addition to the base portion of the current collector, the current collector was loaded with varying weights of the conductive carbon and copper mixture by the vacuum technique described in connection with FIG. 6. The cells were discharged through a 2 ohm resistor to a cut off voltage of 1.5 volts.

In one set of cells (Set 1), the void volume represented as 25 in FIG. 1 was completely filled with electrolyte solution (void volume = 100%). In a second set of cells (Set 2) the void volume was occupied by solid polypropylene spacers (void volume = 0). The results were as follows:

TABLE I

| Cell | Void Volume | Additional conductive Current Collector (mg) | Life (mA hr) |
|------|-------------|---------------------------------------------|--------------|
| 1A | 100% | 0 | 265 |
| 1B | 100% | 50 | 308 |
| 1C | 100% | 75 | 336 |
| 1D | 100% | 100 | 363 |
| 1E | 100% | 200 | 42<br>113[1] |
| 2A | 0% | 0 | 292[1] |
| 2B | 0% | 50 | 363 |
| 2C | 0% | 75 | 353 |
| 2D | 0% | 100 | 420 |

[1]Measured through 1.8 ohm resistor.

EXAMPLE 2

Test cells were constructed according to the procedure described in Example 1 having an electrolyte solution void volume equal to 100%, 50% and 0%. The cells were discharged through 2 ohm and 1.8 ohm resistors to a 1.5 volt cutoff voltage. The current collectors had a base portion weighing 260, 300, 360 or 450 mg. The results are tabulated below:

TABLE II

| Cell | Base current Collector Weight (mg) | Additional Current Collector Weight (mg) | % Void Volume | Life (mA hr) 2.0 ohm | 1.8 ohm |
|------|-----|-----|-----|-----|-----|
| 1A | 260 | — | 100 | 265 | 263 |
| 3A | 260 | — | 50 | 315 | 305 |
| 2A | 260 | — | 0 | — | 292 |
| 1D | 260 | 100 | 100 | 363 | 319 |
| 3D | 260 | 100 | 50 | 394 | 320 |
| 2D | 260 | 100 | 0 | 420 | 403 |
| 1F | 360 | — | 100 | 356 | — |
| 3F | 360 | — | 50 | 304 | — |
| 2F | 360 | — | 0 | 337 | — |
| 1A | 260 | — | 100 | 265 | 263 |
| 3B | 300 | — | 100 | 316 | 302 |
| 1F | 360 | — | 100 | 356 | — |
| 3C | 450 | — | 100 | 376 | 359 |
| 1B | 260 | 50 | 100 | 308 | — |
| 2B | 260 | 50 | 0 | 363 | — |
| 1C | 260 | 75 | 100 | 336 | — |
| 2C | 260 | 75 | 0 | 353 | — |

From the above Tables it may be seen that the life of the cell increases by adding increasing weight of a current collector made according to the instant invention. The data for cell 1E does not follow the trend for the reason that there is a limit to the thickness of a collector which may be used in a cell of fixed dimensions since the cell is fabricated by compressing and sealing the upper and lower halves of the cell casing. In cell 1E, this compression caused a breakdown of the components within the cell thereby shortening cell life, however, this problem may be remedied by increasing the height 15 of the cell (FIG. 1) and/or by decreasing the thickness or density of other cell components.

From Table II it may be seen that by reducing the electrolyte solution void volume of the cell, cell life is increased. Without altering the external cell dimensions, it may be seen that cell 2D containing 100 mg of current collector according to the instant invention, and having electrolyte solution void volume of zero, produced optimum cell life.

What is claimed is:

1. An electrochemical cell comprising:
   an anode;
   a liquid cathode including an ionically conductive solute;
   a solid nonconsummable porous current collector having a first constituent consisting of an electrically conducting material which is less electropositive than said anode, and a second constituent consisting of an electrically nonconductive material, said first and second constituents being combined such that the resistivity of said current collector varies inversely with the distance from said anode;
   a porous separator mechanically separating said anode from said current collector;
   wherein substantially the total volume of said liquid cathode in said cell is contained within the pores of said current collector and said separator.

2. A cell according to claim 1 wherein said electrically nonconductive material consists essentially of a ceramic.

3. A cell according to claim 2 wherein said current collector also serves as said separator.

4. A cell according to claim 3 wherein said current collector comprises:
   a first portion consisting of a ceramic mat containing particles of said electrically conductive material such that the quantity of said particles per unit surface are gradually increased from zero at the uppermost surface in contact with said anode to a quantity at the lowermost surface sufficient to substantially decrease the electrical resistivity with said current collector;
   and a second portion contacting said lowermost surface consisting of a layer comprising particles of said electrically conducting material.

5. A cell according to claim 4 wherein said electrically conductive material consists essentially of carbon and copper.

6. A cell according to claim 5 wherein said anode consists of lithium.

7. A cell according to claim 6 wherein said liquid cathode is thionyl chloride.

8. A cell according to claim 2 wherein said current collector comprises a plurality of layers, each layer containing a different percentage by weight of said electrically conducting material, wherein said layers are arranged with the layer containing the least amount of electrically conducting material is situated closest to said anode and with each successive layer containing a greater percentage of electrically conducting material than the preceding layer.

9. A cell according to claim 8 wherein said electrically conducting material consists essentially of carbon and copper.

10. A cell according to claim 9 wherein said electrically nonconductive material consists essentially of alumina.

11. A cell according to claim 10 wherein said anode is lithium.

12. A cell according to claim 11 wherein said liquid cathode is thionyl chloride.

* * * * *